Sept. 6, 1932.   E. L. THEARLE ET AL   1,876,526
DYNAMIC BALANCING MACHINE
Filed July 23, 1931    3 Sheets-Sheet 1
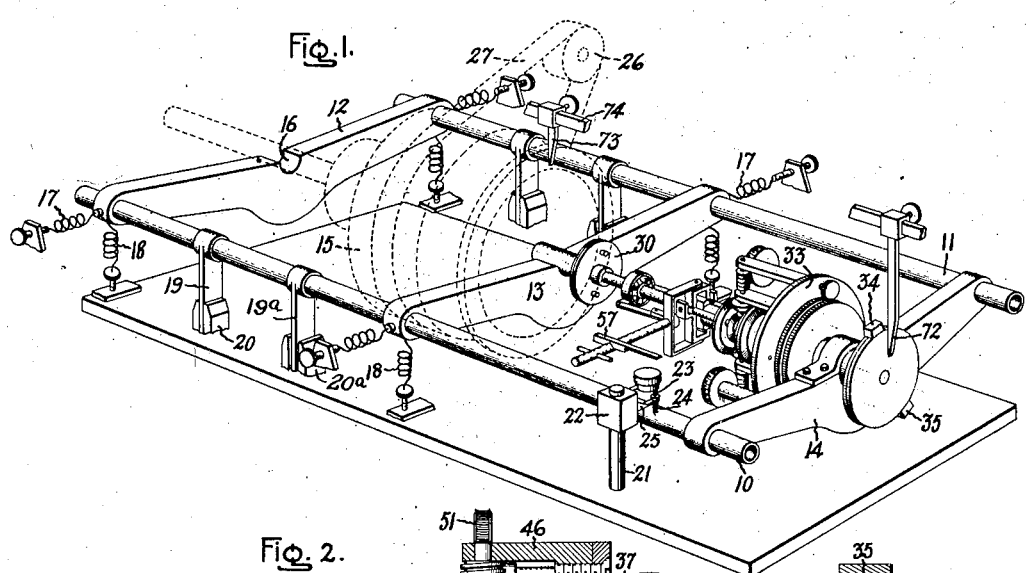
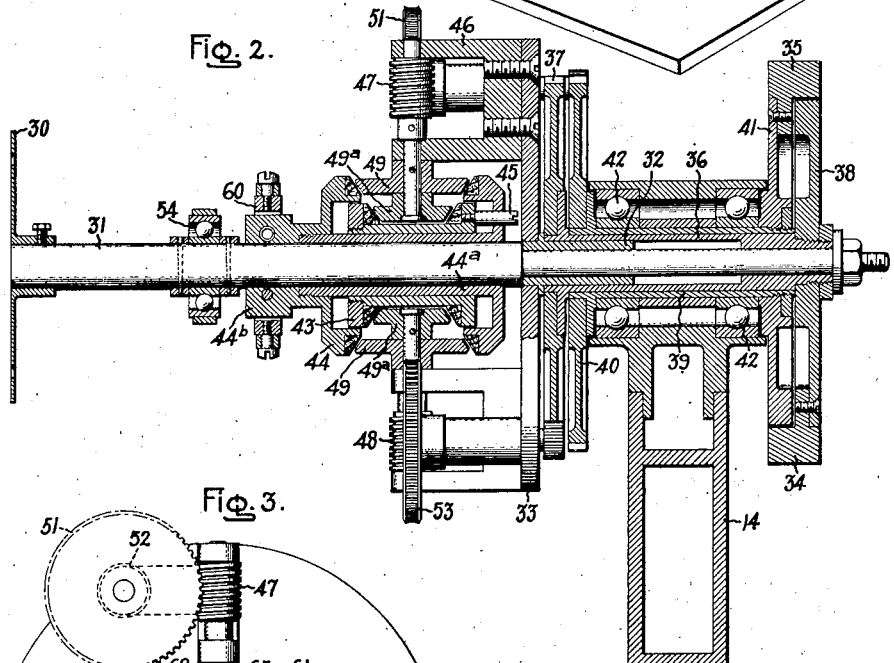
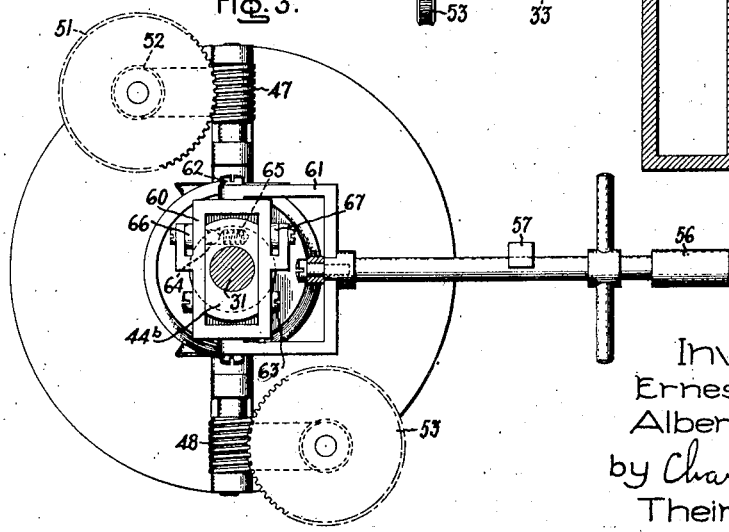
Inventors:
Ernest L. Thearle,
Albert B. Hubbard
by Charles E. Jullar
Their Attorney.

Sept. 6, 1932.  E. L. THEARLE ET AL  1,876,526
DYNAMIC BALANCING MACHINE
Filed July 23, 1931   3 Sheets-Sheet 2
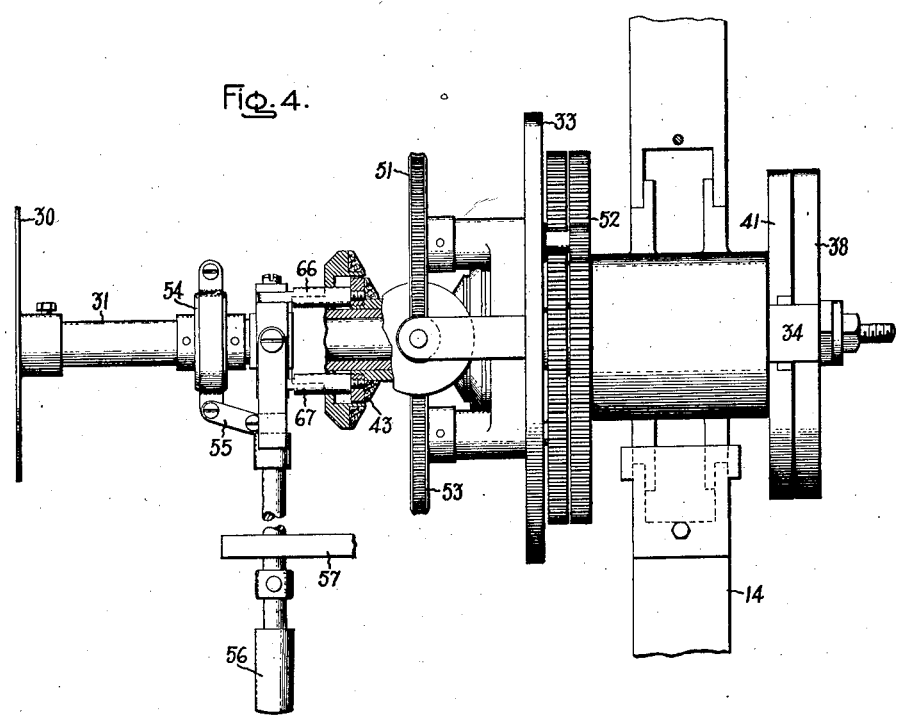
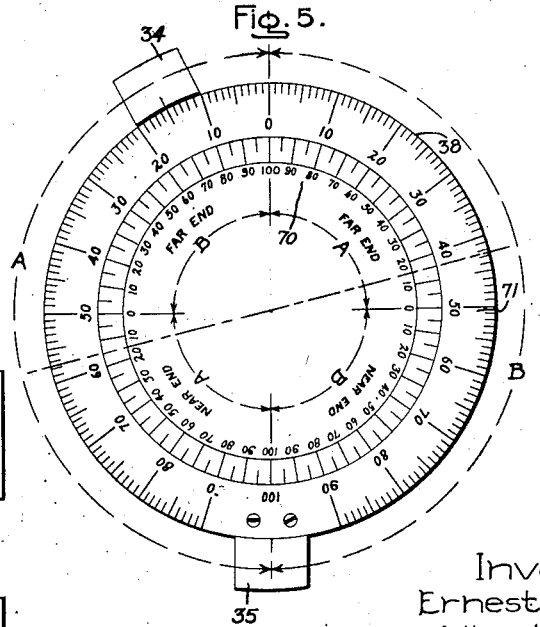
Inventors:
Ernest L. Thearle,
Albert B. Hubbard
by Charles E. Tuller,
Their Attorney

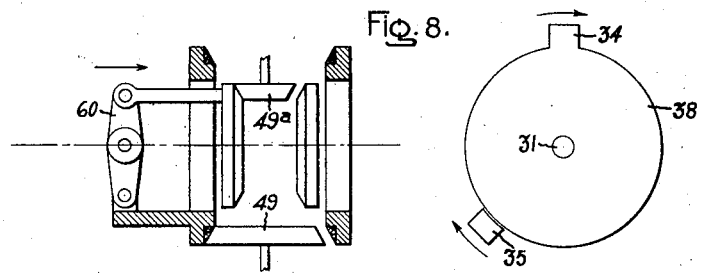
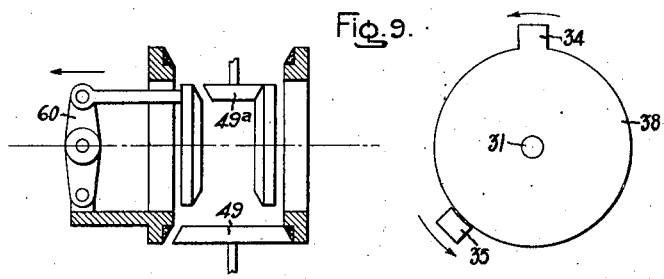
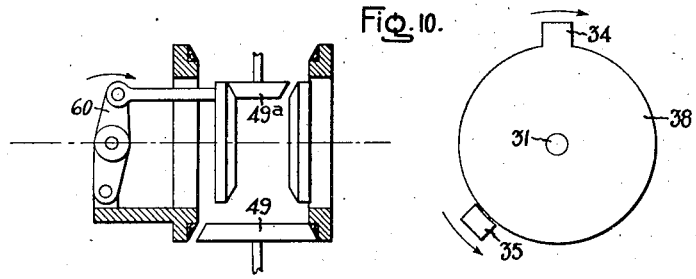
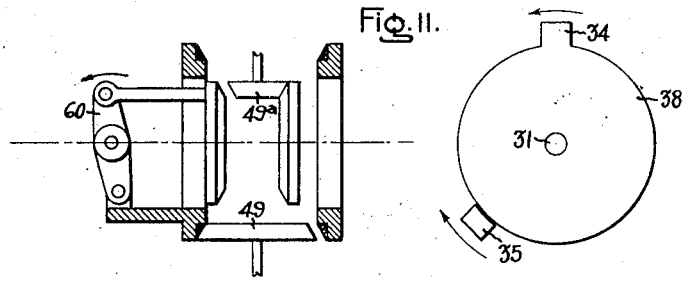
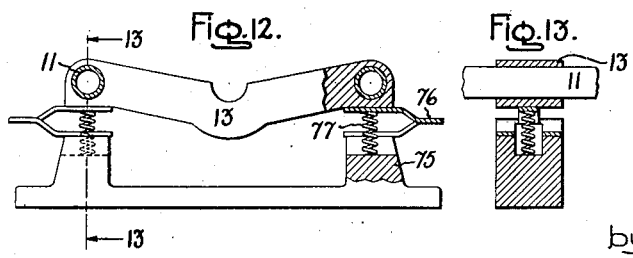
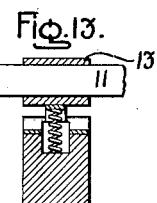

Patented Sept. 6, 1932

1,876,526

UNITED STATES PATENT OFFICE

ERNEST L. THEARLE AND ALBERT B. HUBBARD, OF SCHENECTADY, NEW YORK, ASSIGNORS TO GENERAL ELECTRIC COMPANY, A CORPORATION OF NEW YORK

DYNAMIC BALANCING MACHINE

Application filed July 23, 1931. Serial No. 552,776.

The present invention relates to machines for dynamically balancing rotating bodies and more especially to relatively heavy bodies intended to rotate at comparatively high speeds, although not necessarily limited thereto since it is capable of balancing relatively light bodies and moderate speed bodies as well.

The object of our invention is the provision of an improved balancing machine whereby the amount and location of an unbalanced mass in a rotating body can be quickly and accurately determined while the body is rotating by the movement of power actuated weights subject to manual control.

For a consideration of what we believe to be novel and our invention, attention is directed to the accompanying description and the claims appended thereto.

In the accompanying drawings which are illustrative of our invention, Fig. 1 is a perspective view of a dynamic balancing machine; Fig. 2 is an axial section of a balancing head; Fig. 3 is an end view of said head illustrating means for adjusting the weights carried by the head; Fig. 4 is a plan view of the balancing head; Fig. 5 is a front view of the scales and the balancing weights; Fig. 6 is a plan view of a vibration indicator; Fig. 7 is a side elevation of the indicator; Figs. 8 to 11 inclusive are diagrammatic views illustrating the action of certain parts of the machine; Fig. 12 is an end view, partly in section of a modified form of mounting for the cradle, and Fig. 13 is a sectional detail of the same taken on line 13—13 of Fig. 12.

In Fig. 1 is shown a frame or cradle in which the body to be balanced is rotatably supported. As shown, the body is the armature or other rotating part of a dynamo electric machine but this is to be taken as an illustration and not as a limitation of the invention since other bodies may be balanced with equal facility. Likewise, the construction of the cradle or support for the body and its elastic suspension are to be taken as illustrations of suitable constructions and not as limitations of the invention because bodies of different weights and form naturally require modifications in construction and support of the cradle to suit the character of the particular body to be balanced.

As shown, the cradle comprises a pair of parallel tubular members 10 and 11 connected by cross members 12, 13 and 14. The body 15 to be balanced is carried in bearings 16 supported by the cross members 12 and 13 and the balancing head, to be described later, is carried in bearings supported by the cross member 14. The cradle is supported by horizontally disposed adjustable springs 17 of which four are provided, and vertically disposed adjustable springs 18 of which four are provided. These springs are so selected and adjusted as to support the cradle and its load in the desired position and at the same time permit the cradle and the body being balanced to oscillate within reasonable limits in response to any unbalanced mass in said body. In addition to the springs four pivotal supports or fulcrums are employed of which only two are employed at any one time, these two being located in the same transverse plane. Each of these pivots comprises a relatively thin flat strip of metal 19 secured at its upper end to one of the side members of the frame. The lower end of the strip is held in a releasable jaw or clamp 20. When clamped, one part of the cradle is held at a fixed elevation, all other parts being free to move. The strips are sufficiently flexible to permit the parts of the cradle beyond them to oscillate with two degrees of freedom, in other words, to oscillate up and down and also sidewise or horizontally, although in some instances the supports may be so arranged as to permit the cradle to have only one degree of freedom, i. e., in a vertical direction. One pair of these fulcrums is located in a transverse plane of correction of the body while the other pair is located outside of said plane of correction, said planes being parallel to each other in spaced relation. Located adjacent one or both of the tubular members of the cradle is a post 21, Figs. 1, 6 and 7, upon which is mounted a head 22 for supporting a vibration indicator of any suitable construction having a needle or pointer which vibrates with an amplitude determined by the vibration of the cradle. The indicator needle is actuated by a rod 23 and a light spring 24. An arm 25 with suitable friction means is employed to damp the oscillations of the moving part of the indicator. The parts above described are mounted upon the base or bed plate of the machine which is relatively massive so as not to adversely affect the balancing operations.

The body 15 to be balanced is shown in dotted lines so as not to obscure the parts of the machine. It is rotated at balancing speed by a suitable motor as indicated by reference character 26 through a flexible driving belt 27.

Before entering into a detailed description of the balancing head, a brief statement of its general features will be helpful to an understanding of its operation. It is first to be assumed that the amount of unbalance and the region of such unbalance in the body 15 is unknown, hence it is necessary to determine two factors. For this purpose the head which is driven at the same speed as the body is provided with two balancing weights. Power actuated means are provided whereby these weights may be moved in a circular path or paths toward or away from each other from a given position while the head is rotating. This movement has the effect of increasing or decreasing the amount of unbalance in the head depending upon whether the weights are moved toward or away from each other. Other power actuated means are provided operable while the head is rotating whereby the weights may be moved as a unit circumferentially with respect to the head either forwardly or backwardly to change the phase angle. By phase angle is meant the angular relation existing between say the light spot in the body being balanced and the center of gravity of the two weights. Moving the weights circumferentially and collectively toward the position approximating the light spot will have the effect of decreasing the amplitude of oscillation of the system as a whole. More specifically power actuated means are provided (a) for moving the weights toward each other (b) for moving the weights away from each other (c) for moving the weights circumferentially as a unit forwardly and (d) for moving the weights circumferentially as a unit backwardly. In the actual operation of balancing the final results are commonly attained by a combination of all of said movements brought about successively but not always in any prescribed order.

Referring more especially to Figs. 2 to 4, 30 indicates a coupling, one half of which is secured to the shaft of the body being balanced and the other to the shaft 31 of the balancing head so that the two shafts rotate in unison. To the shaft 31 is secured a sleeve 32, having a peripheral portion serving as a bearing. Secured to the sleeve so as to rotate with it and the shaft is a main disk 33 supporting a part of the mechanism for moving the weights 34 and 35. Loosely mounted on the shaft 31 and sleeve 32 is a second sleeve 36 having mounted on its inner end a gear wheel 37. On the outer end of this second sleeve is rigidly mounted a disk 38 carrying the weight 34, Figs. 1 and 5. The weight is detachably secured to the disk by a screw or equivalent means. By making the weights detachable, different weights may be readily applied or removed when bodies of substantially different weight or mass are being balanced at different times in the same machine. The disk 38 is secured to its sleeve by screw threads and an end nut. Surrounding the second sleeve is a third sleeve 39 having secured to its inner end a gear wheel 40 and to its outer end a disk 41 to which the weight 35 is detachably secured, as by a screw. The sleeves make good working fits one on the other and on the shaft and are in turn carried in a pair of ball bearings 42, the races of which are supported by the cross member 14 of the cradle.

Loosely mounted on the shaft 31 of the head so as not to rotate with it are double faced concentric track or driving wheels 43 and 44 which may be of the friction type and are slidably connected by one or more axial pins 45. The wheels 43 and 44 are termed "track wheels" because the beveled wheels revolving with the head roll upon them when the parts are engaged. The track wheel 44 has a long sleeve or hub 44$^a$ finished inside and out and a head 44$^b$, the two parts being united by screw threads. The hub of the double faced inner track wheel 43 surrounds the sleeve or hub 44$^a$ and is arranged to slide axially thereon under certain conditions. The fact that the two track wheels are capable of limited relative movement in an axial direction ensures proper engagement of the driving and driven parts. In other words the arrangement compensates for wear of the working faces of the wheels or for any slight inaccuracy of machining or alignment. Means are provided, as will appear later, whereby both track wheels 43 and 44 can be moved axially to the left to rotate the driven wheels 49 and 49$^a$ in one direction, say clockwise, and to the right to rotate the driven wheels in the opposite direction. Mounted in brackets 46 are worms 47 and 48, the axes of which are in the same transverse plane. On the inner end of the shaft of the upper worm 47 are mounted two cone wheels 49 and 49$^a$. The outer cone wheel 49 is pinned to the shaft to rotate it while the inner wheel 49$^a$ is loose thereon and forms an idler serving to balance the end thrust when the friction wheels are active. The idler also serves as a counterbalance for a wheel on the opposite side of the shaft 31. The construction and arrangement of the two cone wheels below the shaft is the same as above described with the exception that the inner wheel is pinned to the worm shaft and the outer wheel is loose thereon and acts as a counterbalance and also as a thrust absorbing means. As shown, the parts are in the neutral position and the main supporting disk 33 and worms are free to revolve with the shaft 31 without affecting the position of the weights 34 and 35.

In order to transmit motion to the weights, relative to the rotor being balanced, the upper worm 47 meshes with a worm wheel 51, best shown in Figs. 3 and 4, the shaft of which latter is carried in a bearing mounted on the main disk 33. On the right hand end of the shaft is a pinion 52 and its teeth mesh with those on the gear wheel 40 for moving disk 41 and its weight 35. Similarly, the lower worm 48 drives the worm wheel 53, the shaft of which drives a pinion the teeth of which mesh with the teeth on gear 37 for moving the disk 38 and its weight 34.

In order to turn the worm shafts on their axes while they are rotating with the main disk 32, it is necessary bodily to move the track wheels in an axial direction. As before stated, these wheels are loosely mounted on a sleeve structure on the shaft 31 and are held against rotation. A suitable way to move the track wheels is to provide a ball bearing thrust collar 54 on the shaft 31 in fixed axial relation thereto. To this collar is attached a link 55, the outer end of which serves as a fulcrum for the actuating handle 56 of the controlling device. The handle is held in its central or neutral position by a suitable device, for example, a strip of metal 57 having a depression to receive the handle.

The head 44$^b$ of the track wheel structure is flattened on two sides, as best shown in Fig. 3. Embracing the head in the region of the flattened sides is a rectangular yoke 60, which is moved back and forth in the direction of the axis of the shaft 31. The yoke is moved by a fork 61 having pivot pins 62. The fork is rigidly secured to the operating handle 56, and the yoke and fork prevent the track wheels from turning. The yoke 60 is connected to the flattened sides of the head 44$^b$ by a pair of aligned pivot pins 63 located below the axis of shaft 31. By means of the fork 61 and handle 56 the yoke may be tilted forwardly or to the right and backwardly or to the left from its neutral position, the latter being the one shown. To assist in locating the neutral position, the head is provided with a recess containing a ball 64 and a spring 65, said ball entering a shallow socket in one wall of the yoke. Pivotally connected to the sides of the yoke are two rods 66 and 67, Figs. 3 and 4, the opposite ends of which are secured to the inner track wheel 43 to move it back and forth. The axis of the pivots connecting the rods to the yoke are located the same distance above the axis of the shaft 31 as the axis of the yoke pivots 63 are located below the shaft axis and in the same vertical plane, the purpose being to ensure equal axial movements of the inner and outer track wheels but in opposite directions. The same arrangement also ensures proper engagement of the track and driven wheels when the handle is twisted on its longitudinal axis. To state the matter another way, when the handle is twisted in a clockwise direction, the rods push the inner track wheels to the right, and since the yoke is pivoted to the head 44$^b$ at 63 the outer track wheels will be shifted to the left. As a result the track and driven wheels are brought into proper engagement and the pressures of engagement are equalized through the several pivots.

As it is somewhat difficult to follow the various movements of the track and driven wheels and their effect on the weight carrying disks, diagrams Figs. 8 to 11 inclusive are presented, which clearly show what takes place. In these figures, 60 indicates the yoke of the preceding figures.

Fig. 8 shows the yoke as having been bodily moved to the right with the result that both driven wheels 49 and 49$^a$ are rotating in the same direction which causes both disks carrying the weights 34 and 35 to move together in the same direction with corresponding angular movements relative to the rotor being balanced, as shown by the arrows.

Fig. 9 shows the yokes as having been bodily moved to the left with the result that both driven wheels 49 and 49$^a$ are rotating in the same direction but one which is opposite to that above specified. This causes both disks carrying weights 34 and 35 to move together in the same direction with corresponding angular movements as shown by the arrows. However, the direction of movement relative to the rotor being balanced is reversed from that shown in Fig. 8. In both of these figures are illustrated movements which would change the phase angle of the weights with respect to the point or region of unbalanced mass in the body being balanced.

In Fig. 10 the yoke 60 is shown as tilted or twisted clockwise with the effect of causing the inner and outer track wheels to become active in such a way that the weights 34 and 35 move away from each other, as indicated by the arrows.

In Fig. 11 the yoke 60 is shown as tilted or twisted counter-clockwise with the effect of causing the inner and outer track wheels to become active in such a way that the weights 34 and 35 move toward each other, as indicated by the arrows. Movements of the weights referred to in Figs. 10 and 11 have the effect of decreasing or increasing the unbalance introduced by the balancing head, depending of course upon which way the weights are moved.

Our invention involves the principle that if W represents the weight of one of the movable weights 34 or 35, and R represents the radius to the center of the mass of the weight, then the unbalance in the plane thereof will be $2WR \cos \frac{\phi}{2}$ where $\phi$ is the angle subtended by the weights. Since the weights are known and their radius R may be measured and their product given a suitable constant, the sole variable for different values of unbalance in the plane of the head will be the cosine of one-half of the angle defined by the centers of the weights 34 and 35 and the axis of rotation. The distance between the vertical plane of correction passing through the fulcra 19 and that of the weights 34 and 35 and the radius of the body in the plane of correction can be measured and reduced to a constant whereby the unbalance in the body 15 may be measured in terms of the value of the cosine of one-half of the angle subtended by the weights.

In Fig. 5 are shown two scales 70 and 71, both being engraved on the disk 38. The outer scale plate is provided with a double set of radial marks or divisions each numbered from zero to 100 and covering 180°. The inner scale is provided with four sets of radial marks or divisions, each numbered from zero to 100 and covering 90°. The outer scale is used to measure the angle between the weights. The inner scale is used to locate the line of symmetry of the weights by transferring the reading of the outer scale to one of the quadrants of the inner scale, depending on which half of the outer scale the weight 34 happens to be and which end of the body is being balanced.

In Figs. 12 and 13 is illustrated a type of mounting for the cradle when relatively heavy bodies or rotors are to be balanced. Rising from the base are suitable pillars 75 for supporting the cradle, of which the side tubes 11 and one of the cross-members 13 is shown. Between each of the four pillars and the cradle is located an elastic member comprising a number of parallel elements or legs 76 extending in a substantially horizontal direction and which may be cut from a single piece of flat plate metal or they may be formed separately. As shown, there are three such elements. However the elements are made, they are united at their outer end as indicated at 76. At their inner ends the center element engages the cradle and is fastened thereto, and the outer elements rest on the pillar and are fastened thereto. Such a construction affords the necessary flexibility and permits the cradle to have one degree of freedom, i. e., in a vertical direction. Because the elements are flat and secured at both ends as stated they prevent sidewise or horizontal movement of the cradle and therefore hold the cradle central with respect to the pillars.

Fig. 12 shows how these elements deflect when the cradle is displaced upward during its oscillation, this displacement being greatly exaggerated. Inasmuch as the bodies to be balanced may differ substantially in weight and since it is important that the springs have suitable periods of vibration to suit the weight of said body, a coiled compression spring 77 is associated with each elastic member which rests on a fixed support as the pillar, for example, at its lower end and at its upper end engages a cross member 13. These springs are removable, and hence springs of different characteristics may be inserted at will in the cradle mounting. For lighter bodies said elements may be used without the coiled springs. Because the elements are rigid against horizontal movement, it follows that the pull of the belt of the driving motor will not interfere with the vibrations of the cradle when the motor is placed at one side of the cradle, as shown in Fig. 1.

To simplify the description, reference will be made hereinafter to adding weight to some part of the body undergoing balancing but it is to be understood that the same effect may be obtained by removing weight from the heavy side of the body.

When an unbalanced body or combination of bodies is mounted in an elastically supported cradle, as is described above, and is rotated at an increasing or decreasing speed, at least one speed is found at which the amplitude of cradle oscillation reaches a maximum. This speed is called the "resonant" speed of the system, and it is at this speed that the smallest amounts of unbalance in the rotating parts can be detected and the balancing machine is most sensitive.

When a comparatively light body is being balanced it is usually possible to immediately rotate it at, or above, the resonant speed, but such is not usually the case with heavy bodies, for example, those weighing more than about 300 pounds and where the critical speed of the body in its mounting is of the order of 600 R. P. M. Under such conditions to immediately drive the body at the resonant speed might result in serious injury to the operator or to the machine. One of the advantages of this invention lies in the fact that it is both possible and convenient to progressively annul the effects of unbalance in the rotor, as the speed is increased step-by-step, by manipulating the control handle 56 so as to gradually move the weights 34 and 35 to such positions as decrease the cradle oscillation to a minimum. The final adjustment of the positions of weights 34 and 35 may be made at the resonant speed at which the machine is most sentitive to small unbalances.

As described above, the two longitudinal cradle members 10 and 11 have mounted on them two pairs of fulcrums or pivotal supports, such as at 19, projecting downward into corresponding clamps, as at 20. One method of using the machine involves adjusting the first pair of pivots to be used, for example, those farthest from the balancing head, to lie in the second correction plane of the rotor to be balanced, that is, that transverse plane of the rotor in which the second balance correction weight will be added. The second pair of fulcrums to be used may be placed in any convenient transverse plane of the rotor to be balanced.

One method of operating our improved machine is as follows: The body 15 to be balanced is mounted in the cradle and connected to the motor 26 by the belt 27, the tension of which may be adjusted in any suitable way. The balancing head is connected to the shaft of the body by the coupling 30 so that the two will rotate in synchronism. The clamps 20 of the pair of fulcrum supports 19 nearest to the balancing head are released and the clamps under the fulcrums farthest from the balancing head, and lying in the second plane of connection, are tightened. The operator starts the motor 26 and as the speed increases notes the total amplitude of movement or swing of the needle of the vibration indicator caused by the movements or vibrations of the cradle. If the vibration is not large the speed of the motor is further increased. As hereinbefore stated, the control handle may be made to assume any one of four positions. The positions are in pairs, the components of which are similar but opposite handed.

Assuming nothing to be known as regards the lack of balance of the body 15, the operator shifts the handle 56 into one of its positions at random. If as a result of this the vibration increases the operator shifts the handle into the opposite position and so maintains it until the vibration is reduced to a minimum. If the point of minimum vibration is thereby passed, the handle may momentarily be shifted to the first position to bring it back. The operator then shifts the handle to one or the other of the two remaining positions and maintains the one which reduces the vibration. The last movement so chosen will reduce the vibration to zero or near enough so that a slight movement of the handle into one of the former pair of positions will do so. During such times as the weights are being moved toward or away from each other, the center line of the weights with respect to the rotor remains unchanged. A small movement in either direction will promptly show at the vibration indicator whether the change is in the right or wrong direction and suitable correction is made. These actions may be continued until the resonant speed is attained when the final adjustments of the weights are made. As a matter of fact it only requires a very few minutes to balance even a heavy body by the means outlined after it is properly mounted in the cradle. After the body is brought to rest the position of the two weights with respect to the outer scale 70 may be noted. The operator then turns the body 15 by hand if sufficiently light to permit of this or by power means if too heavy until the pointer 72, Fig. 1, is half way between the weights 34 and 35 on the head; in the present illustration until the pointer registers with 15 on the inner scale. A second pointer 73 being mounted on the same bar 74 and in alignment with the first will indicate the exact angular spot or position on the body 15 where additional weight is to be added in the first balancing plane, i. e., the one nearest the balancing head.

The next step is to add the corrective weight to the body 15 on the end adjacent the head, in the first plane of correction, after which the clamps 20 of the fulcra 19 are released in the second so-called plane of correction and the clamps 20ª caused to engage with the fulcra 19ª in the first plane of correction, after which the balancing operation is repeated, the only difference being in the use of the scale marked "For end". In this case the correction weight will be added to the end of the body remote from the balancing head in a position determined by the scales and pointers and substantially as previously described.

In balancing relatively heavy bodies or rotors the labor and time spent in mounting the body in the machine preparatory to the balancing operation and removing the same after balancing are substantial items in the cost of the total operation, hence it is of great practical importance once the body is in place to perform all the necessary balancing operations while it is so mounted as distinguished from performing some of the operations in the machine and others outside of the machine, as, for example, making certain readings or indications when the body is in the machine and then removing it to apply balancing weights to one end or part of the body and repeating the operations for the other end. In our improved machine all of the balancing operations including the application of the proper weights in the proper position are done without removing the body from the machine, all of which can be done in a small percentage of the time required to set up and remove the body. A further advantage and one of great practical value is that the operator by increasing the rotative speed of the body step-by-step is able to make partial adjustments step-by-step and thus avoid having to run the body at full balancing speed before any compensation or determination can be made. In this manner it is a comparatively simple matter to balance bodies which are badly out of balance without danger to the operator or to the machine itself.

What we claim as new and desire to secure by Letters Patent of the United States, is:

1. In a balancing machine, the combination of a base, a support for the body being balanced, an elastic suspension for the support carried by the base, a means for rotating the body at any desired speed, a member carried by the support and rotating in synchronism with the body, a pair of weights in spaced relation carried by and rotating with the member, and power actuated mechanism operable while the member is rotating for either changing the angular relation of the weights one with respect to the other or simultaneously moving the weights as a unit to change their phase relation with respect to the unbalanced mass of said body.

2. In a balancing machine, the combination of a base, a support for the body being balanced, an elastic suspension for the support carried by the base, a means for rotating the body at any desired speed, a member carried by the support and rotating in synchronism with the body, a pair of weights mounted on the member to move angularly thereon about a common axis relative to the member, a power actuated means operable when the member is rotating to change the angular relation of one weight with respect to the other, and a second power actuated means for collectively moving the weights circumferentially about the member without disturbing the angle between them.

3. In a balancing machine, the combination of a base, a cradle adapted to carry the body to be balanced, an elastic suspension for the cradle supported by the base, spaced fulcrums for the cradle which are alternately active, means for rendering the fulcrums active and inactive at will, a means for rotating the body at any desired speed, a head rotating in synchronism with the body, a pair of weights mounted on the head to move angularly about its axis, power actuated means for moving the weights separately or collectively, and a controller whereby the power means may be started and stopped at will while the said body and head are rotating.

4. In a balancing machine, the combination of a base, a cradle adapted to carry the body to be balanced, an elastic suspension for the cradle supported by the base, a means for rotating the body at any desired speed, a head, a shaft for the head supported by the cradle and rotating with the body, releasable spaced fulcrums carried by the base and employed alternately to support the cradle with one degree of freedom, a pair of weights arranged to move angularly about the axis of the head and relative thereto, means for utilizing the rotary movement of the head for moving the weights on the head one with respect to the other, other means also utilizing the rotary movement of the head for moving the weights as a unit circumferentially about the head, and a controller external of the head whereby both of said means may be started and stopped.

5. A balancing head for the purpose described comprising a main revolving disk, a shaft therefor, a pair of balancing weights, an independent rotating support for each weight having the same axis as the shaft, gearing supported by and rotating with the main disk for moving each of the weights angularly with respect to the disk and to each other and in a circular path, all independently of the rotary movements of the disk, means carried by the shaft for actuating said gearing, and a controller for said means.

6. A balancing head for the purpose described, comprising a main revolving disk, a shaft therefor, a pair of balancing weights, and independent support for each weight, said supports having the same axis as the shaft, gearing means carried by the main disk and rotating with it for independently and collectively moving the weights while the disk is rotating, axially adjustable non-rotating track wheels mounted on the shaft, and means for moving the track wheels axially at will into and out of engagement with the gearing and means for starting and stopping them.

7. A balancing head for the purpose described, comprising a main revolving disk, a shaft therefor, a pair of balancing weights, and independent support for each weight, said supports having the same axis as the shaft, gearing means carried by the main disk, other gearing supported by the shaft for transmitting motion from the first mentioned gearing to the supports for the weights, normally inactive tracks sleeved on the shaft, whereby the gearing on the main disk may be started into motion, and means for moving the tracks into and out of engagement with the gearing to cause angular movements of the weights relatively to the disk and independently thereof.

8. A balancing head for the purpose described, comprising a main revolving disk, a shaft therefor, a pair of balancing weights, an independent support for each weight, said supports having the same axis as the shaft, driven wheels mounted on the disk, gearing also mounted on the disk and driven by the wheels, gearing for each weight support driven by the first named gearing for moving the supports angularly with respect to the disk while it is rotating, track wheels sleeved on the shaft and prevented from rotating therewith, and a controller for moving the track wheels separately or collectively into and out of engagement with the driven wheels.

9. A balancing head for the purpose described, comprising a main revolving disk, a shaft therefor, a pair of balancing weights, an independent support for each weight, said supports having the same axis as the shaft, gearing carried by the disk, a pair of gears adjacent the disk having the same axis of rotation and driven by the gearing on the disk, a means connecting each of said pair of gears with a weight carrying support, a non-rotating means surrounding the shaft, and a controller for moving the non-rotating means axially into and out of engagement with the gearing carried by the disk.

10. A balancing head for the purpose described, comprising a main revolving disk, a shaft therefor, sets of driven wheels and gears mounted on the disks, said sets being one on each side of the shaft axis and in the same transverse plane, a pair of gears located beside the main disk, gears and shafts for transmitting motion from the gears on the main disk to said pair of gears, concentric sleeves connected one to each of the pair of gears, a disk connected to each of the sleeves, a weight attached to each disk, track wheels mounted to slide on the aforesaid shaft and prevented from turning therewith, and means for shifting the stationary track wheels into and out of engagement with the driven wheels revolving with the main disk.

11. A head for a dynamic balancing machine comprising a main disk, a shaft for supporting and rotating the disk at the same speed as the body being balanced, a pair of weights revolving with the disk and normally standing in spaced angular relation, disks for supporting the weights, two independent means carried by the main disk and located on opposite sides of its axis for changing the angular relation of the weights one with respect to the other and for circumferentially moving the weights as a unit independently of the main disk to change the phase relation of the disks and weights.

12. A balancing head comprising a shaft, a main disk mounted thereon, gearing means carried by the disk which include a pair of opposed beveled wheels located at different radial distances from the axis of the shaft, a pair of double faced concentric track wheels sleeved on the shaft, means for moving the track wheels into and out of engagement with the beveled wheels to cause either forward or backward rotation thereof, a pair of adjustable weights, a separate support for each weight, and gearing means connecting the beveled wheels to the weight supports for moving the weights angularly about the axis of the shaft.

13. A balancing head comprising a rotating shaft, a main disk driven thereby, gearing means carried by the disk which include a pair of opposed beveled wheels located at different radial distances from the axis of the shaft, a pair of non-rotatable double faced concentric track wheels sleeved on the shaft and independently movable, a yoke connected to both of the track wheels, and a means for moving the yoke axially to cause the track wheels to engage the same sides of both of the beveled wheels and to twist the yoke to cause the track wheels to engage opposite sides of said beveled wheels.

14. In a balancing machine, the combination of a base, a cradle adapted to support the body to be balanced, an elastic suspension for the cradle supported by the base, spaced fulcrum means for the cradle, one of which is located in the transverse correction plane of the body and the other outside of said plane, a device for rendering each of said fulcrum means active or inactive, a balancing head rotating in synchronism with the body and comprising a shaft, a main disk, a pair of weights, a disk for each weight carried by the shaft, means mounted on the main disk for adjusting the weights circumferentially with respect thereto to correct for phase relation while preserving their respective angular positions, other means also mounted on the main disk for moving the weights one with respect to the other to correct for unbalance in the body while preserving the relation between their mean angular position and that of the body, and a control device comprising a means slidable on the shaft for controlling the action of both of said means.

15. In a balancing machine, the combination of a base, an elastic support for the body to be balanced which has one degree of freedom, a motor for rotating the body, a balancing head also carried by the elastic support and rotating in synchronism with the body, a pair of independently movable weights carried by and rotating with the head, power actuated means for simultaneously moving both weights circumferentially on the head as the latter rotates, other power actuated means for moving said weights independently of each other on the head as the latter rotates, and manually controlled means common to both power actuated means for controlling their operations.

16. In a balancing machine, the combination of a base, a cradle for the body to be balanced, and elastic supports interposed between the base and cradle for sustaining the weight of the cradle, each comprising horizontally disposed elastic elements, certain of which are secured to the base and the remainder to the cradle, said elements yielding in a vertical plane and being rigid in a horizontal plane.

17. In a balancing machine, the combination of a base, a cradle for the body to be balanced, and elastic supports interposed between the base and cradle for sustaining the weight of the cradle, each comprising a number of substantially horizontal elastic elements rigidly united at their outer ends and at their inner ends respectively rigidly secured to the base and the cradle, said elements permitting the cradle to move bodily in a vertical plane and preventing horizontal movements thereof.

18. In a balancing machine, the combination of a base, a cradle for the body to be balanced, elastic supports for the cradle, each comprising a number of flat yielding members which are united at their outer ends and are respectively secured to the base and cradle at their inner ends, and a removable compression spring located between the base and the cradle and in alignment with each of the supports to assist in supporting the weight of the cradle and the body carried thereby, and to control the resonant speed of the system.

In witness whereof, we have hereto set our hands.

ERNEST L. THEARLE.
ALBERT B. HUBBARD.